F. R. PACKHAM.
BEARING.
APPLICATION FILED FEB. 20, 1912.

1,050,995.

Patented Jan. 21, 1913.
2 SHEETS—SHEET 1.

F. R. PACKHAM.
BEARING.
APPLICATION FILED FEB. 20, 1912.

1,050,995.

Patented Jan. 21, 1913.
2 SHEETS—SHEET 2.

Witnesses
Oliver T Clarke
Chas. J. Webb

Inventor
Frank R. Packham
By
Attorneys

UNITED STATES PATENT OFFICE.

FRANK R. PACKHAM, OF SPRINGFIELD, OHIO, ASSIGNOR TO THE AMERICAN SEEDING MACHINE COMPANY, OF SPRINGFIELD, OHIO, A CORPORATION OF OHIO.

BEARING.

1,050,995.

Specification of Letters Patent. Patented Jan. 21, 1913.

Application filed February 20, 1912. Serial No. 678,891.

*To all whom it may concern:*

Be it known that I, FRANK R. PACKHAM, a citizen of the United States, residing at Springfield, in the county of Clark and State of Ohio, have invented certain new and useful Improvements in Bearings, of which the following is a specification.

My invention relates to improvements in bearings, and particularly to bearings adapted for use in connection with disk furrow-openers for seeding machines.

An object of the invention is to provide a bearing occupying a comparatively narrow space; also a bearing in which the wearing surfaces may be readily adjusted to take up wear; also, to provide a bearing in which the wearing parts will readily aline themselves with respect to each other and maintain themselves in alinement; also, to provide a suitable protecting housing for the bearing parts but which in itself forms no part of the bearing surfaces; further, to provide for lubricating the bearing surfaces in an effective manner and for readily flushing or draining the housing when desired; further, to provide an improved form of packing to prevent the entrance of dirt into the housing; and, generally, to provide a bearing which will be simple in construction and effective in operation.

My invention consists in the construction and combinations of parts hereinafter described and set forth in the claims.

Figure 2:
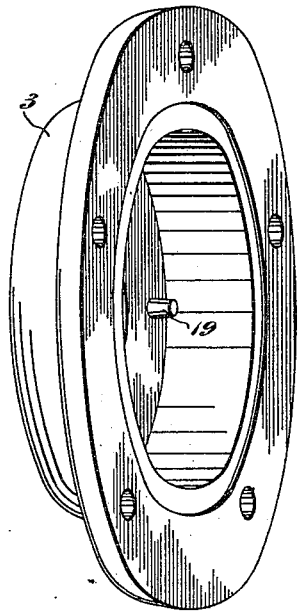
Figure 1:
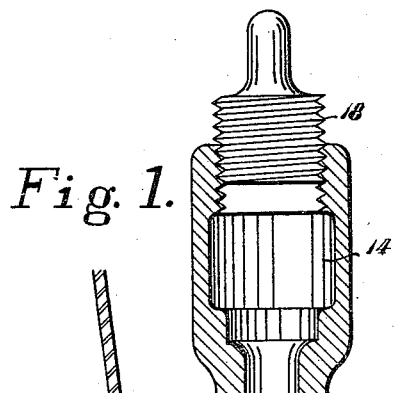
Figure 4:
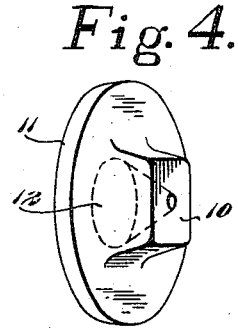
Figure 3:
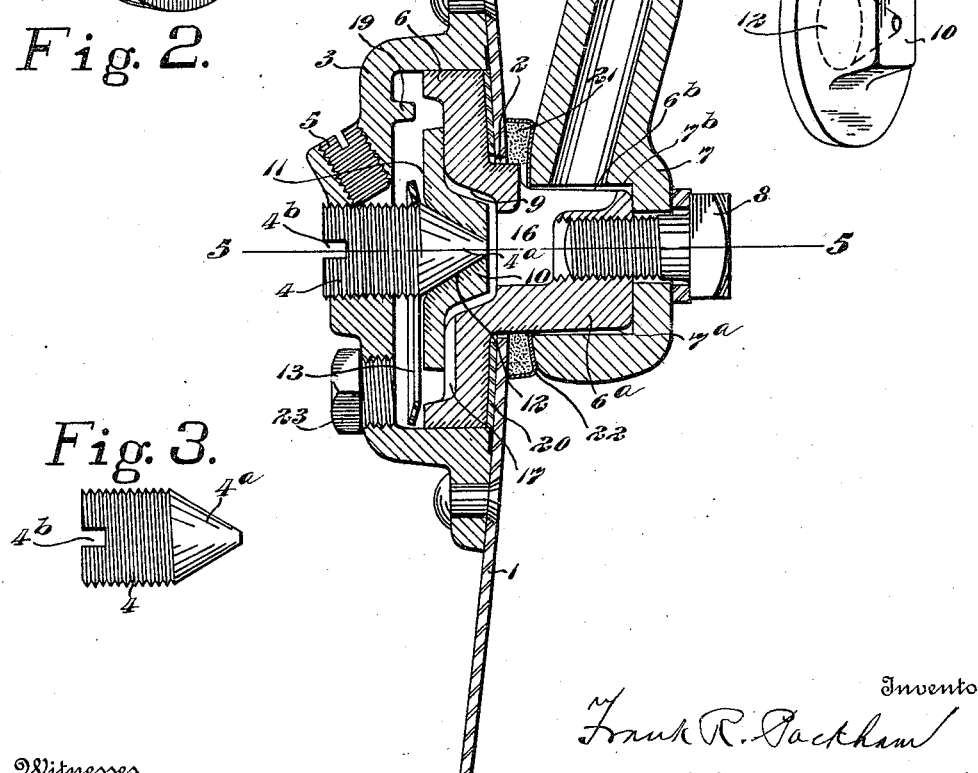
Figure 6:
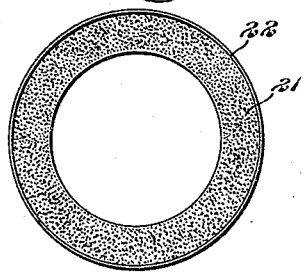
Figure 5:
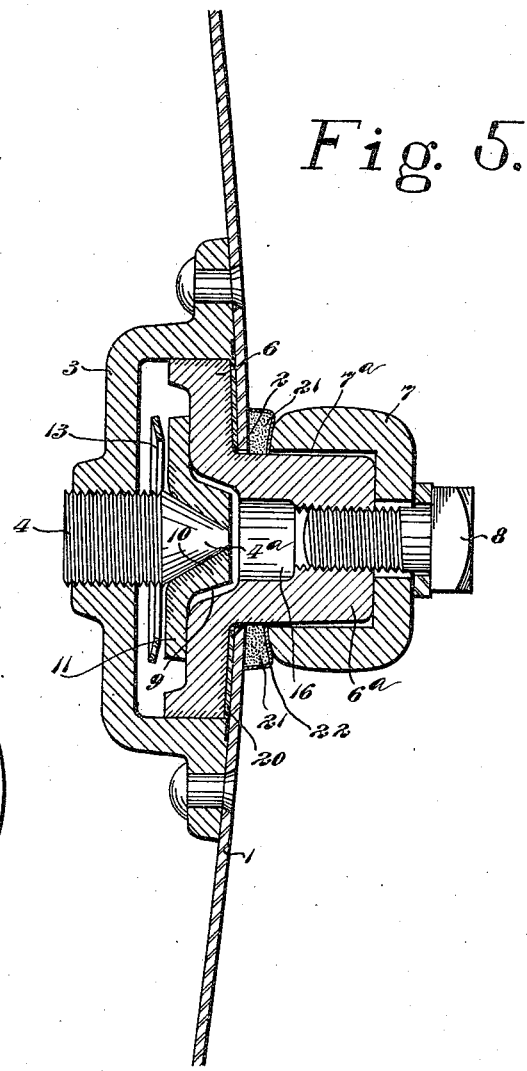
Figure 7:
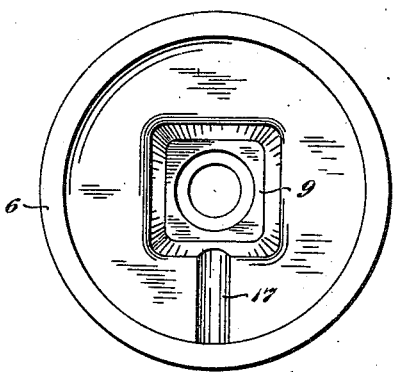

In the accompanying drawings:—Figure 1 is a vertical section through a disk furrow-opener having a bearing embodying the features of my improvements. Fig. 2 is a perspective view of the housing or cap. Fig. 3 is a detail of the adjustable cone-shaped bearing. Fig. 4 is a detail in perspective of the opposing bearing member proper. Fig. 5 is a transverse section on the line 5—5 of Fig. 1. Fig. 6 is a detail of the packing and its casing. Fig. 7 is a side view in detail of the block.

Like parts are represented by similar characters of reference in the several views.

In the construction of disk furrow-openers for seeding machines, it is desirable in certain types of machines that as little space laterally as possible be occupied by the furrow-openers, since the close proximity of adjacent furrow-openers causes, under severe straining, the bumping of the hubs and frequent locking of the same, while in furrow-openers which have greatly projecting hubs, the passage of surface trash is to a large extent prevented or retarded. Many attempts have been made to overcome these difficulties by providing bearings for the disks, which will be of comparatively small compass laterally, all or most of which have comprehended caps or housings which are permanently riveted to the disks. Such a construction, while possessing manufacturing advantages, has precluded the possibility of taking up the wear incident to use, and in no manner provides means for correcting manufacturing discrepancies such as loose fitting bearings.

In disk furrow-openers, it is necessary that the disk be maintained at certain arbitrary angles with reference to the line of draft and also to the vertical to insure perfect results, and in the present practice of manufacture and design of the ordinary flat or ring bearings, because of the fact that, as before stated, no means are provided for taking up irregularities caused by manufacturing discrepancies, or of taking up the wear, many difficulties are encountered, one of the most frequent being that any slack in the bearing will permit the disk, by reason of the soil resistance, to bear heavily against the usual shield or blade which lies adjacent to the disk, causing an undue amount of friction and rapid wear of the blade, and leaving, as the disk wabbles, a large space between the disk and shield, which quickly fills in with stubble, straws and vines, eventually stopping the rotation of the disk. In overcoming these and other difficulties and in accomplishing the objects before stated, I make use of the following described construction:

In the said drawings, 1 represents a disk of the usual concavo-convex form employed in disk furrow-openers. The disk has the usual central opening 2, about which is secured on the concave side of the disk, preferably by riveting, a housing or cap 3. Screw-threaded into a centrally-arranged opening in the side wall of this cap 3 is a plug 4, having a cone-shaped inner end $4^a$; the outer end of this plug being provided with a notch $4^b$ to receive a screwdriver or other tool for the purpose of adjusting the plug to any desired position. In order to lock this bearing plug in its adjusted position, there is inserted into the wall of the cap an angularly-arranged set-screw 5, adapted to be screwed down so as to impinge the threads of said plug. Located in the cap or housing 3, is a circular block 6, the shank or boss 6ª of which extends through the central opening in the disk and into a recess 7ª in the lower part of the frame 7 of the furrow-opening device, being secured therein by a bolt 8, passed through an opening in the support and screwed into a threaded opening in said boss. To prevent the block 6 from turning with respect to the support, the boss 6ª is provided with a flattened surface 6ᵇ fitted to a correspondingly flattened surface 7ᵇ in the recess 7ª. In former structures of this character, the block 6 formed the bearing upon which the disk and housing rotated, the result of which is that, in the course of time, the bearing surfaces become so worn as to cause the disk to wabble, there having been no provision made, as before stated, in former devices for taking up the wear. In the present construction, the block 6 forms no part of the wearing surface, but there is positioned in a centrally located recess 9 in said block the projecting boss 10 of one member of the bearing proper, which is in the nature of a round plate or disk 11 of smaller diameter than the block 6. The recess 9 is somewhat larger than the boss 10, to permit of a certain movement of the plate, but both are formed square in cross-section to prevent the plate 10 from turning. The plate 11 on the side opposite the boss 10 is provided with a cone-shaped recess 12, shown best in dotted lines in Fig. 4, to receive the cone-shaped end of the bearing 4. The result of this construction is that as the cone-bearing 4 is screwed inwardly, the bearing member 11 will adjust itself thereto, the difference in sizes between the recess 9 and the boss 10 permitting of this, and it will also be seen that all wear upon the bearings may be easily taken up by adjusting the member 4.

In order to supply lubricant to the bearings thus formed, I hang loosely over the bearing member 4, between the wall of the housing 3 and the plate 11, a metallic ring 13, which hangs into the lower part of the housing, lubricant being forced into the housing from the lubricant-receiving chamber 14 through the passage 15 in the main frame and passage 16 in the boss 6ª, the passage 16 opening into the recess 9 just back of the boss 10, which is not as deep as the recess 9, so that a passage will be provided between the same and the recessed portion of the block 6, and thence through a passage 17 formed in the block 6 and leading to a point near the bottom of the housing. Heretofore, rings of this character have been employed to convey lubricant to the bearings of a revolving part located in a chamber or casing, the action of the revolving part serving to give the ring a rotary movement through the frictional contact thereof with the revolving part to be lubricated. In bearings of the character described herein, however, it is common to use lubricating grease forced through the passages by the action of the compression plug 18 screwed into the upper end of the chamber 14, and it has been found that the frictional contact of the carrying ring 13 with the revolving bearing 4, is insufficient to carry the ring through this kind of lubricant. In order to overcome this difficulty, I have provided for imparting to the ring a positive movement and this I accomplish by means of a pin 19 projecting inwardly from the wall of the housing, so that upon each revolution of the housing, the pin will contact the lower part of the ring 13, raise it up and cause to be imparted thereto a rotary movement of about a third of its circumference, the adhering lubricant being thereby carried up and deposited on the cone-bearing 4, where it finds its way in between the wearing surfaces of the two bearing members.

In order to flush at times the interior of the bearing, I have provided the cap or housing 3 with a flushing outlet, normally closed by a screw-threaded plug 23, which outlet is located in the vertical wall of the cap near the outer periphery thereof, so that when turned to the lowest position, it will permit a thorough outflow of the contents, which may be previously thinned by means of coal-oil introduced through the oil conduit 15.

To obviate wear between the stationary member 6 and the rotating disk 1, there is interposed a hardened plate or washer 20, placed around the boss 6ª and having an opening which coincides with the opening through the disk. In order to prevent the entrance of dust and grit at this point, there is provided a felt washer 21, arranged about the boss 6ª between the disk and frame 7. In order that this washer may be firmly held in position and effectually close the openings at this point, I inclose the outer periphery and rear side of the washer in a casing 22, formed of a metal which will have a great amount of resiliency or pliability, to permit it to conform itself to irregularity of distance between the parts, so that as the bolt 8 is turned to draw the parts together, the casing 22 will spring in as shown in the drawings and thus compress the washer, but at the same time acting as a protection for it and helping to exclude the dust and grit.

Having thus described my invention I claim:—

1. In a bearing, a rotatable member, a housing secured to said member, a stationary member located in said housing, an adjustable bearing part supported by said housing, and a self-alining bearing part in said housing and resting against said stationary member, the respective bearing parts having inclined bearing surfaces, said self-alining bearing part being capable of a movement with respect to said stationary member to permit said bearing parts to aline themselves.

2. In a bearing, a rotatable member, a housing secured to said rotatable member, a stationary member located in said housing, an adjustable bearing part supported by said housing, and a self-alining bearing part in said housing held from rotation by said stationary member, one of said bearing parts having a cone-shaped bearing surface and the other of said bearing parts having a cone-shaped recess, said self-alining bearing part being capable of a movement with respect to said stationary member to permit said bearing parts to aline themselves.

3. In a bearing, a rotatable member, a housing secured to said rotatable member, a stationary member, an adjustable cone-shaped bearing carried by said housing, and a self-alining cone-shaped bearing in said housing coöperating with said adjustable bearing, said self-alining bearing and said stationary member having inter-engaging parts to hold said self-alining bearing from rotation but permitting the alinement thereof with respect to said adjustable bearing.

4. In a bearing, a rotatable member, a housing secured to said rotatable member, a stationary member in said housing, a bearing plate in said housing, a boss on said plate, said stationary member having a recess to receive said boss but of larger dimensions than the same, said boss having means for holding the same from rotation in said recess, said bearing plate having a cone-shaped recess, and an adjustable cone-shaped bearing supported by said housing coöperating with the cone-shaped bearing surface of said plate.

5. In a bearing, a rotatable member having a central opening, a housing secured to said member, a stationary member in said housing, a boss on said stationary member projecting through the central opening of said rotatable member, a frame part to which said boss is secured, a metallic casing of pliable material encircling said boss between said frame part and said rotatable member, a flexible washer in said casing, and means for clamping the parts together.

6. In a bearing, a stationary member, a rotatable member mounted upon said stationary member, an adjustable bearing part carried by said rotatable member, a self-alining bearing part held from rotation by said stationary member, inclined bearing surfaces on the respective adjustable and self-alining bearing parts, said self-alining bearing part being capable of a movement with respect to said stationary member to permit said bearing parts to aline themselves.

In testimony whereof, I have hereunto set my hand this 15th day of February 1912.

FRANK R. PACKHAM.

Witnesses:
W. L. BRALEY,
CHAS. I. WELCH.

---

Copies of this patent may be obtained for five cents each, by addressing the "Commissioner of Patents, Washington, D. C."